United States Patent Office 2,705,981
Patented Apr. 12, 1955

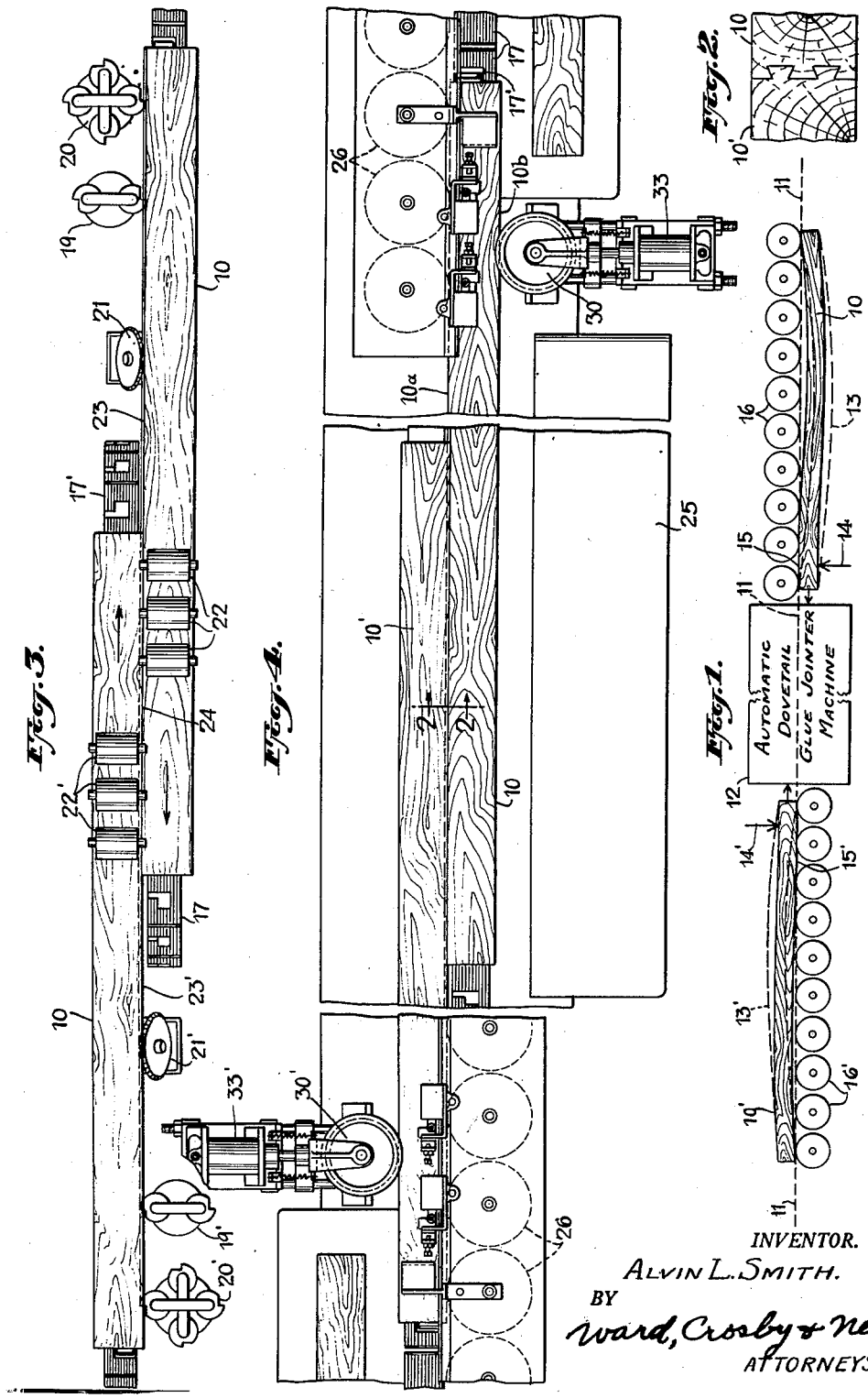

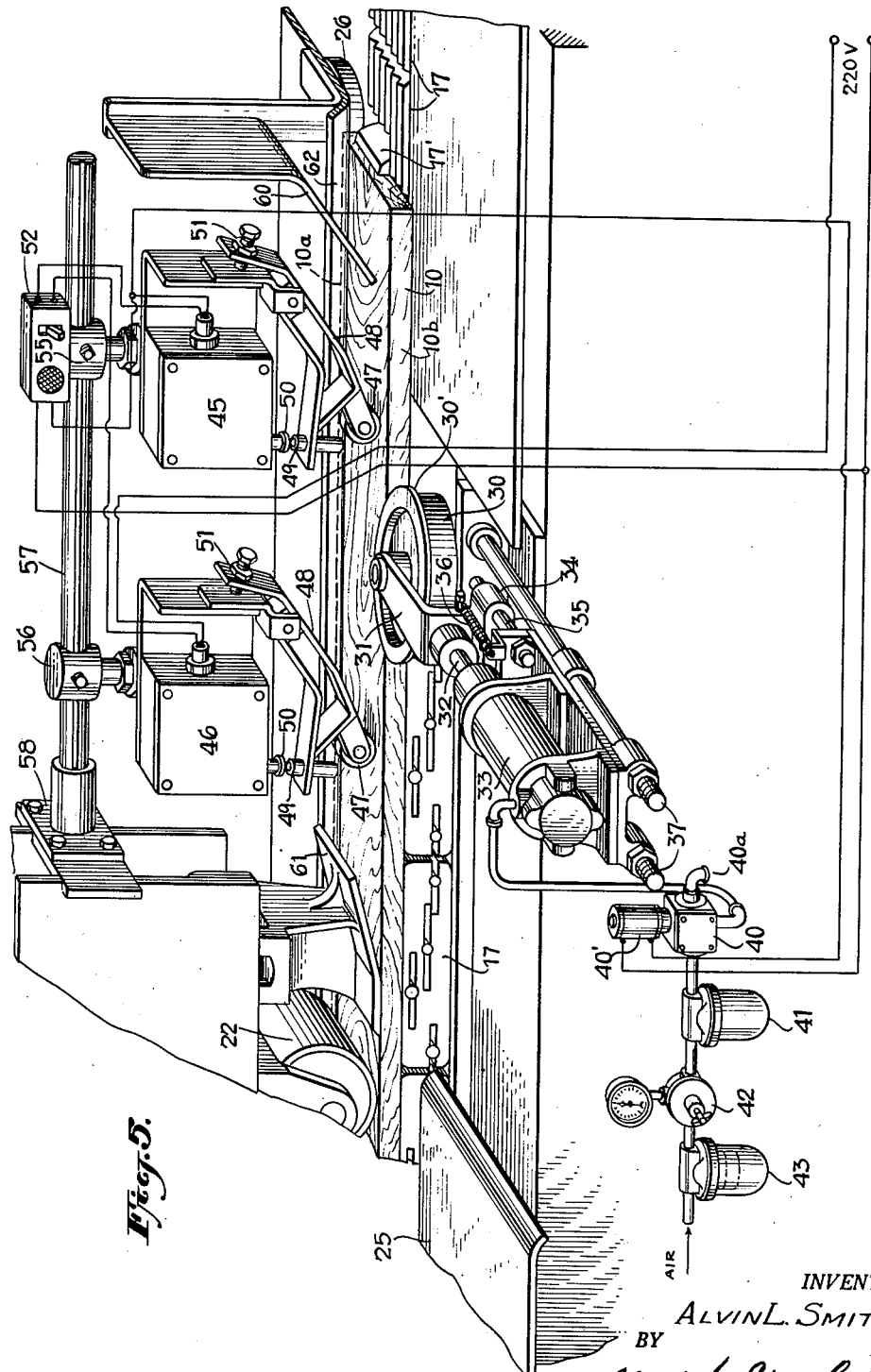

2,705,981

MACHINE FOR JOINING WOOD

Alvin L. Smith, Newburgh, N. Y., assignor to Muskegon Machine Co., Inc., Newburgh, N. Y., a corporation of Delaware Application April 25, 1952, Serial No. 284,304

4 Claims. (Cl. 144—3)

This invention relates to methods and machines for automatically joining together pieces of wood or other fibrous material with tongue and groove joints, and more particularly the invention relates to methods and attachment mechanism suitable for use on or in connection with automatic dovetail glue jointer machines of known types to adapt same for economically joining narrow boards or the like of substantial length and which have become warped or are curved edgewise.

So-called automatic dovetail glue jointer machines of the Linderman type, an early form of which is shown in U. S. Patent No. 661,542 for example, have long been known and are in extensive use for fabricating wood boards, slabs, moldings, columns, etc., from pieces of wood which would otherwise be too narrow for ready marketability or practical use or which are so relatively small as to be valueless except for fuel. In such machines two pieces of wood to be joined are automatically fed toward each other along opposite sides of the desired line of juncture while cutters concurrently form one or more grooves along the edge of one piece and a corresponding tongue or tongues along the edge of the other piece, the tongues and grooves having dovetail-shape cross-sections and preferably also being slightly tapered along their lengths. Glue is also automatically applied to these tongues and grooves so that as the two pieces of wood approach each other and then come into positions side by side, the tongue means as formed on one piece will be slid into the groove or grooves as formed on the other piece. The tapers of the tongue and groove formations are such that the narrowest end of a tongue will first enter the widest end of a groove on the other piece, and as the parts are further slid together, the tongue will finally become forcefully gripped in the groove on the other piece under such pressure that the glue will be forced into the surfaces of the wood and thus the two parts will be firmly and permanently locked together, and may thereafter be sold and used as an integral piece, of value comparable to lumber which is not formed with such joints.

While these machines have been highly successful for joining pieces which are not too long and of which the edges are substantially straight or have been trimmed straight, there are great quantities of lumber available in various parts of the country which is curved or has become warped edgewise and which is so long or narrow that it has not heretofore been suitable for economical use in connection with such machines. If the stock is warped edgewise only slightly, or if it is quite wide and not too long, the edges thereof to be joined may readily be made straight by cutting means on the machines, or by the use of a trimming saw. However, if the wood is seriously curved or warped edgewise, particularly if it is quite narrow and long, any such trimming operations to straighten the edges will be impossible without wasting so much of the stock that the operation will be uneconomical.

According to the present invention, this problem is overcome by feeding the two pieces of wood into the machine in such manner that the warped edge of one piece is arched or bowed at its mid-portion away from the desired line of juncture, the other piece of wood, if also warped, is similarly fed into the machine along the opposite side of the line of juncture but with its mid-portion arched in the opposite direction, also away from said line. And as the pieces progress toward each other, sufficiently heavy pressure is applied to the edges thereof opposite those to be joined, to force the edges which are to be cut with tongues and grooves into straight positions along suitable roller or other means for resisting the pressure. Thus, although the edges to be joined are normally arched away from each other, yet just before the tongues and grooves are cut therein, they are forced into straight line positions, and as the cut tongues and grooves slide together, the normally arched edges are held straight by the interlocking tongues and grooves. Thus little if any wood has to be trimmed from the edges to eliminate the curvatures thereof, and in the final joined product, each piece of wood interacts against the other along the tongue and groove joint to hold each piece straight with less likelihood of future warping than would usually be the case if the product were one integral piece.

Further and more specific objects, features and advantages of the invention will appear from the following detailed description, taken in connection with the appended drawings which form a part of this specification and illustrate, by way of example, a preferred form of the invention.

In the drawings:

Fig. 1 is a schematic diagram illustrating the method of the invention;

Fig. 2 is a cross-sectional view of a typical dovetail double tongue and groove joint such as may be formed with the machines herein referred to;

Fig. 3 is a somewhat schematic diagram showing the principal parts of a Linderman type automatic dovetail-type glue jointer as above referred to;

Fig. 4 illustrates at each end thereof the attachment features forming the subject matter of the present invention, the middle portions of this figure being broken away and largely omitted at the locations where the apparatus as of Fig. 3 is positioned; and Fig. 5 is a perspective view showing in further detail the presently preferred embodiment of the invention.

The method of the invention will first be briefly described in connection with the diagram of Fig. 1, where two boards 10, 10' are shown being fed toward each other along a predetermined desired line of juncture 11, along which they are to be joined by the automatic dovetail glue jointer machine 12. The boards are such that they will normally be warped or bowed edgewise to the positions indicated by the dotted lines 13, 13', but as they are fed into the machine, sufficiently heavy pressure is applied to edges thereof, for example at points indicated by the arrows 14, 14', to force the edges as at 15, 15' which are to be joined, into straight line positions up against a series of rollers as at 16, 16', or other suitable stop means, along which the boards may be fed without excessive friction. Thus continuously as the board edges are about to come into contact with the cutters in the machine for forming the tongues and grooves thereon, the edges will be held firmly in a straight line position, and even though the arched portion of the boards may deviate from the desired straight line position by more than an inch or two, no lumber has to be trimmed away and wasted. The boards may also be so long that the trailing ends thereof as fed to the machine, will extend out substantially beyond the normal limits of the guide means on the machine, and thus pieces which were heretofore too long and narrow to be trimmed straight, may be used.

Referring now to Fig. 3, the essential parts of the known form of machine comprise oppositely movable endless chains 17, 17' for supporting and advancing the boards 10, 10' respectively past tongue or groove cutters as at 19, 20, 19', 20' and glue applicators as at 21, 21'. As the boards enter the machine, they are held down flat firmly on chains or beds as by two series of rollers 22, 22'. As shown in Fig. 3, tongues or grooves have been cut in the board edges at 23, 23', and at the portions of the boards which are overlapped, such tongues and grooves have become interlocked together at 24.

The arrangement of parts shown in Fig. 3 may be considered as occupying the space at the mid-portion of Fig. 4. Usually such machines are provided with means for automatically ejecting the joined boards after the tongues and grooves thereon have come into final position, the ejection being sideways onto a receiving table as at 25.

The apparatus embodying the novel features of the invention at the right hand end of the machine as shown in Fig. 4 will now be described, these features being shown enlarged and in further detail in Fig. 5, and it will be understood that like equipment is provided at the left hand end of the machine, as shown in Fig. 4, except that the latter is reversed in position with respect to the line of juncture.

Preferably as best shown in Fig. 4, a series of disclike rollers 26 are provided and mounted along the incoming portion of the endless chain 17, on vertical axes and with their peripheries tangent to the plane of the desired line of juncture.

As shown in Figs. 4 and 5, board 10 is being fed along the endless chain 17, the links of which have depressible lugs as at 17' for engaging and pushing against the ends of the boards. The edge 10a of the board is pressed up against the rollers 26, just in advance of the point where the board enters the main part of the machine, by a pressure applying roller 30 positioned in a horizontal plane and having at its upper edge a peripheral flange 30' for engaging the top surface of the board at the edge 10b thereof to insure that the board will be held down firmly on the endless chain.

With the construction as shown, the roller 30 is rotatably mounted in a yoke 31 carried on a plunger rod 32 of a suitable fluid-operated cylinder and piston device 33, the piston therein preferably being operated by compressed air. The yoke 31 has a dependent portion 34 slidably engaging a rod 35 for retaining the yoke against turning about the rod 32. A spring 36 is provided for normally retracting the roller 30 when the air pressure is released from the cylinder. The cylinder may be mounted for slidable adjustment on rods as at 37 to permit the normal position of the roller 30 to be adjusted transversely of the path of the boards to accommodate boards or pieces of wood of varying widths.

The admission of compressed air to the cylinder device 33 may be controlled by any suitable known form of solenoid operated valve means 40, preceded in turn by a lubricator 41, a pressure regulator 42 and a filter 43. A pair of limit switches or the like are contained in boxes 45 and 46 for controlling through the circuit as shown in Fig. 5, the solenoid 40' of the valve 40. These limit switches respectively are controlled by rollers 47 mounted on pivoted arms 48 carrying detent means 49 for engaging vertically reciprocable switch operating members at 50. The range of pivotal movement of the members 48 may be adjusted as by set screw means 51 to limit the up and down movement of the rolls 47. A safety cut-out switch and pilot light are provided in a box at 52.

The limit switches 45, 46 and the safety switch 52 are all connected in series with the solenoid 40' and a source of electric current and so that all three of the switches have to be in closed circuit positions before the solenoid 40' is energized to open the valve 40 and admit air pressure to the cylinder at 33. As a board is being fed into the machine, its forward end will engage the roller 47 for closing the first limit switch at 45, and, assuming that the safety switch 52 is then on, the circuit will be fully prepared for energizing the solenoid 40' except for the closing of limit switch at 46. Then as soon as the forward end of the board actuates the roller 47 for limit switch 46, the latter switch will complete the circuit, thus energizing the solenoid and causing the pressure cylinder to force the roll 30 into engagement with the edge 10b of the board with sufficient pressure to deflect the edge 10a of the board from its normal bowed shape to a straight line position along the rollers 26, or at least that portion of the board which is approaching the machine will be thus deflected and its edge straightened. Then as the rearward end of the board passes under the roller 47 for the switch 45, this switch will be opened, thus deenergizing the solenoid 40' and allowing the air pressure to escape from cylinder 33 through a discharge outlet 40a at valve 40. This will cause release of the pressure of roller 30 against the board fairly promptly. The roller will be retracted by the spring 36. But since by this time the forward portions of the board will have had a tongue or groove formed thereon and slid into locking engagement with the tongue or groove on another board, the pressure from roller 30 is no longer needed to hold straight the board edge 10a. Then as the rear end of the board passes on under the roller 47 for limit switch 46, this switch will be opened and the circuit will be in condition for the next operation with the next board. The reason for providing two of the limit switches 45, 46 in series and in spaced positions, one just in advance of the roller 30 and the other subsequent thereto as shown, is that the turning on of the air pressure should not occur until the forward end of the board has passed the roller 30, whereas the shutting off of the air pressure should occur before the rear end of the board reaches the roller 30. It will be apparent that if the pressure roller 30 were moved up into position before the forward end of the board passes, then the roller would tend to obstruct the advance of the board or jam against its forward end. On the other hand, if the pressure on the roller 30 should not be released until after the rear end of the board has passed, then the roller would be moved abruptly by the air cylinder device up against the endless chain or the stop members thereon, or jam against other parts abruptly. For these reasons air pressure acting against roller 30 is released just before the end of the board passes, and the pressure is not restored again until after the forward end of the next board has passed.

The boxes for the limit switches 45, 46 may be carried on bracket members 55, 56, which may each be clamped at adjustable positions along a rod 57, the lefthand end of which, in turn, is rigidly mounted on suitable bracket means 58 carried by the main part of the machine. A guard 60 may be mounted just in advance of the operating roller for limit switch 45 to protect same against any danger that the board or portions thereof will be high enough or rise high enough to injure the roller. A similar guard member 61 is mounted just in advance of the rollers 22 in the machine to insure that the forward end of the board will be deflected down if necessary into position to enter properly beneath the rollers 22.

To insure that the edges as at 10a of the boards as they enter the machine will be held down in proper position for contact with the rollers 26, an inclined guard plate portion as at 62 may be provided to extend along the board.

All essential parts of the apparatus may be readily adjusted within wide limts to provide for boards of different thickness and lengths and the invention provides attachment means for permitting the dovetail glue jointer machines to be readily used for fabricating wood assemblies of all of the types hereinabove mentioned and which have been customarily made with such machines, while at the same time permitting use of very badly warped pieces of wood which heretofore have long been considered quite unsuitable for such purposes and have had no value except for fuel.

The invention may, of course, be used in cases where one of the wood pieces has a straight edge and the other has an edge seriously warped edgewise, and in that case the attachment means embodying the invention would be needed only on one end of the machine. However, usually it will be found desirable to provide like attachment means at both ends of the machine, as the stock available will generally mostly be warped at least somewhat in one direction or the other, so that the two pieces conveniently may be positioned and fed into the machine in the manner indicated in Fig. 1. Then in the finished product the two boards will mutually restrain each other against any restoration of their edgewise warped conditions.

Although a preferred embodiment of the invention is herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. In combination with a dovetail jointer machine, apparatus for feeding thereto wood strips and the like and for simultaneously straightening the edges thereof which are to be joined, comprising an endless chain type bed means for supporting and advancing the wood strips, a series of rollers mounted on vertical axes arranged along said bed means and having their peripheries tangent to the desired line of joining, a roller for engaging the strip edges opposite the edges to be joined, at a point shortly in advance of the entry of the strips into the joint forming parts of the machine, fluid pressure operated cylinder and piston means for urging the latter roller against the strips to press same against said series of rollers, electrically operated valve means for controlling the admission and discharge of fluid pressure for the piston means, a pair of switches for controlling said electrically operated valve means, actuators for said switches positioned respectively to be operated upon approach of each strip end to the latter roller and subsequent to passage of each strip end past said latter roller, the valve and switch connections being arranged to admit the fluid pressure just after the front end of a strip has passed the latter roller and to discharge the fluid pressure just before the back end of a strip reaches the latter roller.

2. Apparatus for feeding boards, strips of wood and the like members which are normally warped or bowed edgewise, and for maintaining an edge thereof in straightened condition upon entry to a jointer machine, said apparatus comprising a travelling bed for supporting and advancing the members to the machine, means arranged in a straight line along said travelling bed and having movable surface portions engaging the edge of the members to be straightened, a roller for engaging the opposite longitudinal edge of the members as same advance, fluid pressure operated cylinder and piston means for applying heavy pressure to the axis of said roller in a direction whereby the roller is pressed against the members and the latter in turn are pressed against said first named means, electrically operated valve means for controlling the admission and discharge of fluid pressure for the piston means, a pair of switches both connected in series with such electrically operated means, actuators for said switches positioned respectively to be operated upon approach of each member end to said roller and subsequent to passage of each member end past said roller, the valve and switch connections being arranged to admit the fluid pressure just after the front end of a member has passed the roller and to discharge the fluid pressure just before the back end of a member reaches the roller.

3. In combination with a jointer machine having dovetail cutters, apparatus for feeding thereto wood strips and the like having curved edges which are to be joined, and for simultaneously straightening such edges, comprising endless chain type bed means for supporting and advancing the wood strips, which are to be joined respectively, into each end of the machine, a series of rollers at each end of the machine mounted on vertical axes arranged along said bed means and having their peripheries tangent to the desired line of joining, those rollers which are at one end of the machine being located along one side of said line, and those at the other end of the machine being located along the other side of said line, a roller at each end of the machine for engaging the strip edges opposite the edges to be joined, at a point shortly in advance of the entry of the strips to the cutters of the machine, and fluid pressure operated cylinder and piston means for urging the latter rollers against the strips to press same against said series of rollers and thereby hold such curved edges substantially straight at the cutters.

4. In combination with a dovetail jointer machine, apparatus for feeding thereto wood strips and the like for simultaneous straightening the edges thereof which are to be joined, comprising conveyor means for supporting and advancing the wood strips, anti-friction stop means extending along such edges and against which said strip edges are adapted to be held under pressure, a roller for engaging the strip edges opposite the edges to be joined, at a point shortly in advance of the entry of the strips into the joint-forming parts of the machine, a power device for urging said roller against the strips to press same against said anti-friction means, mechanism for controlling said power device comprising elements positioned respectively to be actuated upon approach of each strip end to said roller and subsequent to passage of each strip end past said roller, said elements acting to cause said power device to apply pressure to said roller just after the front end of a strip has passed the roller and to release said power device from applying pressure to the strip just before the trailing end of a strip reaches the roller.

References Cited in the file of this patent

UNITED STATES PATENTS

| Number | Name | Date |
|---|---|---|
| 661,542 | Linderman | Nov. 13, 1900 |
| 780,921 | Trout | Jan. 24, 1905 |
| 1,174,777 | Tomlinson | Mar. 7, 1916 |
| 1,183,013 | Lane et al. | May 16, 1916 |
| 1,543,158 | Hobart et al. | June 23, 1925 |
| 1,590,881 | Brouwer | June 29, 1926 |
| 1,736,641 | Zimmerman | Nov. 19, 1929 |
| 2,273,653 | Melby | Feb. 17, 1942 |
| 2,335,768 | Kinports | Nov. 30, 1943 |
| 2,507,644 | Peters | May 16, 1950 |